US007455758B2

(12) United States Patent
Müller et al.

(10) Patent No.: US 7,455,758 B2
(45) Date of Patent: Nov. 25, 2008

(54) FLUIDIC MICROSYSTEM COMPRISING FIELD-FORMING PASSIVATION LAYERS PROVIDED ON MICROELECTRODES

(75) Inventors: Torsten Müller, Berlin (DE); Thomas Schnelle, Berlin (DE)

(73) Assignee: PerkinElmer Cellular Technologies Germany GmbH, Hamburg (DE)

( * ) Notice: Subject to any disclaimer, the term of this patent is extended or adjusted under 35 U.S.C. 154(b) by 349 days.

(21) Appl. No.: 10/536,674

(22) PCT Filed: Nov. 26, 2003

(86) PCT No.: PCT/EP03/13319

§ 371 (c)(1), (2), (4) Date: Jul. 29, 2005

(87) PCT Pub. No.: WO2004/050252

PCT Pub. Date: Jun. 17, 2004

(65) Prior Publication Data

US 2006/0024802 A1 Feb. 2, 2006

(30) Foreign Application Priority Data

Nov. 29, 2002 (DE) ................................ 102 55 858

(51) Int. Cl.
*G01N 27/447* (2006.01)
*G01N 27/453* (2006.01)

(52) U.S. Cl. ........................ 204/547; 204/643; 204/601; 204/451

(58) Field of Classification Search ................. 204/547, 204/643
See application file for complete search history.

(56) References Cited

U.S. PATENT DOCUMENTS 6,113,768 A * 9/2000 Fuhr et al. .................. 204/643

(Continued)

FOREIGN PATENT DOCUMENTS

| | | | |
|---|---|---|---|
| DE | 198 15 882 | A1 | 10/1999 |
| DE | 198 60 117 | A1 | 7/2000 |
| DE | 198 60 118 | C1 | 9/2000 |
| WO | WO 00/69565 | A1 | 11/2000 |

OTHER PUBLICATIONS

Cummings, et al., "Dielectrophoretic Trapping Without Embedded Electrodes", Proceedings of SPIE vol. 4177 (2000); pp. 164-173.

(Continued)

*Primary Examiner*—Alex Noguerola
(74) *Attorney, Agent, or Firm*—Caesar, Rivise, Bernstein, Cohen & Pokotilow, Ltd.

(57) ABSTRACT

Described is a fluidic microsystem (100) including at least one channel (10) through which a particle suspension can flow; and first and second electrode devices (40, 60) which are arranged on first and second channel walls (21, 31) for generating electrical alternating-voltage fields in the channel (10); wherein the first electrode device (40) for field shaping in the channel includes at least one first structure element (41, 51); and the second electrode device (60) includes an area-like electrode layer (61) with a closed second electrode surface which includes a second passivation layer (70); wherein the effective electrode surface of the first structure element (41, 51), of which element (41, 51) there is at least one, is smaller than the second electrode surface; and the second passivation layer (70) is a closed layer which completely covers the second electrode layer (61).

13 Claims, 6 Drawing Sheets

U.S. PATENT DOCUMENTS

| | | | | |
|---|---|---|---|---|
| 6,352,838 | B1 * | 3/2002 | Krulevitch et al. | 435/34 |
| 6,387,707 | B1 | 5/2002 | Seul et al. | |
| 6,685,812 | B2 * | 2/2004 | Miles | 204/547 |
| 6,727,451 | B1 | 4/2004 | Fuhr et al. | |
| 6,749,736 | B1 | 6/2004 | Fuhr et al. | |
| 6,787,018 | B1 * | 9/2004 | Miles et al. | 204/643 |
| 2002/0166766 | A1 | 11/2002 | Seul et al. | |

OTHER PUBLICATIONS

Fuhr, et al., "Electric-field-mediated inhibition of cell and microparticle adhesion: a new way to create bio-repellent surfaces", Sensors and Actuators B 26-27 (1995); pp. 468-470.

Fuhr, et al., "Positioning and Manipulation of Cells and Microparticles Using Miniaturized Electric Field Traps and Travelling Waves", Sensors and Materials, vol. 7, No. 2 (1995); pp. 131-146.

Müller, et al., "A 3-D microelectrode system for handling and caging single cells and particles", Biosensors and Bioelectronics 14 (1999); pp. 247-256.

Reimer, et al., "Fabrication of electrode arrays in the quarter micron regime for biotechnological applications", Sensors and Actuators A 46-47 (1995); pp. 66-70.

Schnelle, et al., "Adhesion-Inhibited Surfaces. Coated and Uncoated Interdigitated Electrode Arrays in the Micrometer and Submicrometer Range", Langmuir 12 (1996); pp. 801-809.

* cited by examiner

Fig. 1
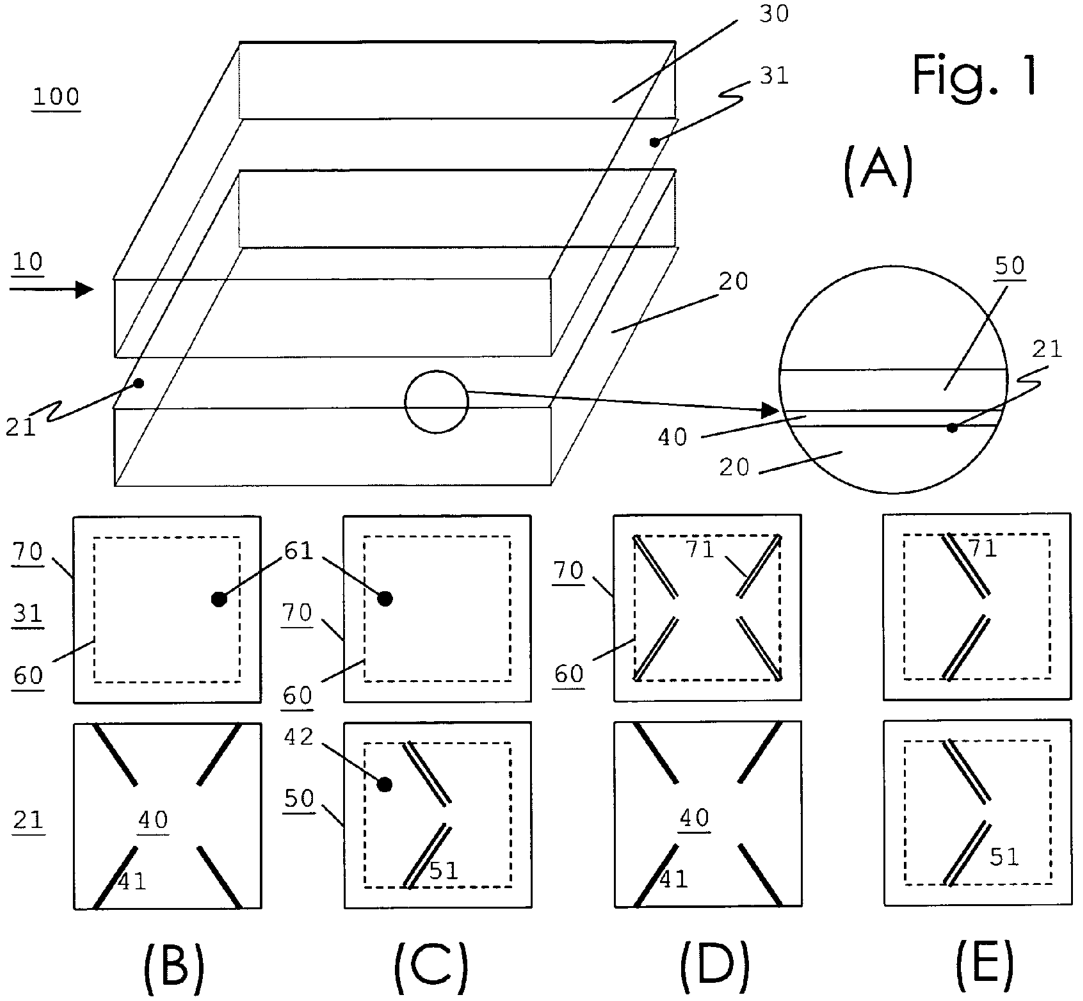
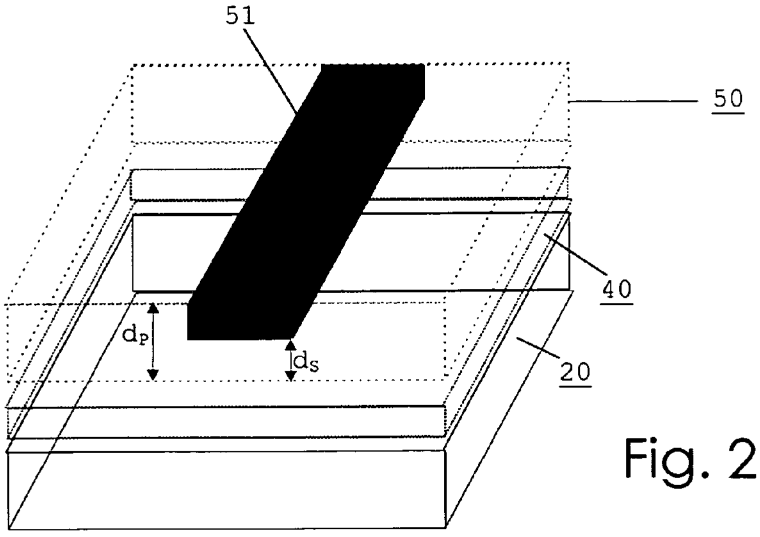
Fig. 2

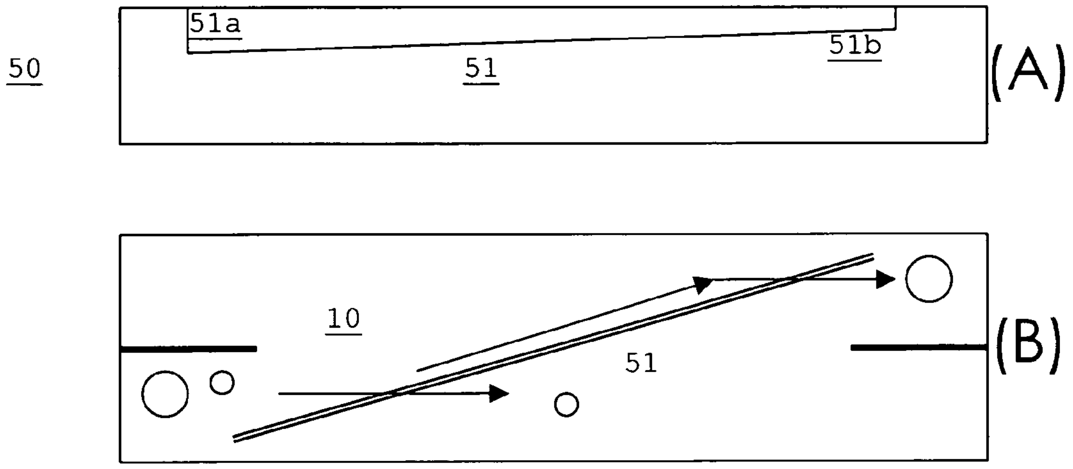
Fig. 4
Fig. 5
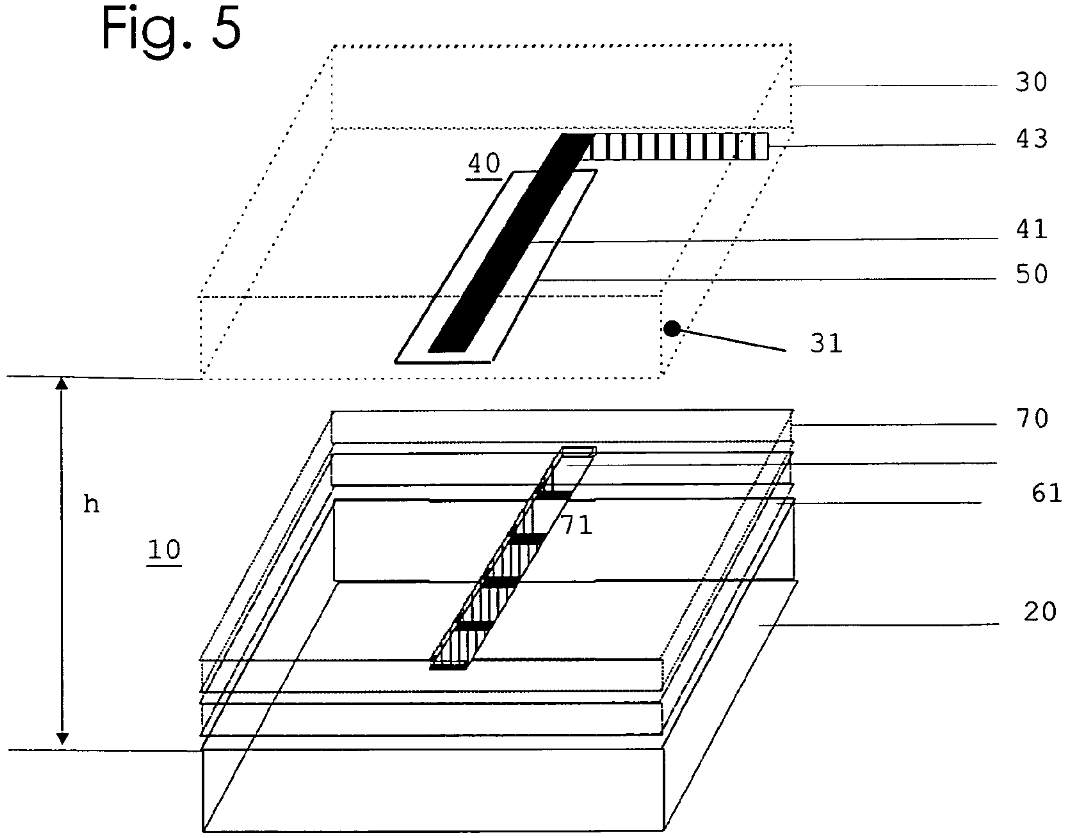

FLUIDIC MICROSYSTEM COMPRISING FIELD-FORMING PASSIVATION LAYERS PROVIDED ON MICROELECTRODES

This application is a 371 of WO application number PCT/EP2003013319, filed Nov. 26, 2003, which claims priority from German Patent application no. 10255858.2, filed on Nov. 29, 2002.

BACKGROUND OF THE INVENTION

The invention relates to a fluidic microsystem and to a method for particle manipulation, in particular for particle manipulation with high-frequency electrical fields.

It is known to manipulate suspended particles (e.g. biological cells, cell groups, cell components, macromolecules or synthetic particles in suspension solutions) in fluidic Microsystems with high-frequency electrical fields which are generated with the use of microelectrodes in channels of the microsystem (see e.g. T. Schnelle et al. in "Langmuir", vol. 12, 1996, pp. 801-809). Touchless particle manipulation (e.g. moving, stopping, deflecting, fusing, etc.) is based on negative dielectrophoresis. It is well known to at least partly cover the microelectrodes arranged on channel walls with an electrically insulating thin layer in order to minimize undesirable interaction between the microelectrodes and the suspension medium or the particles, such as e.g. ohmic losses, electrolysis, induction of transmembrane potentials etc. (passivation of the microelectrodes).

Typically, the fluidic microsystems comprise spatial electrode arrangements. The microelectrodes are arranged at opposite, e.g. upper and lower, channel walls with typical spacing ranging from 10 μm to 100 μm (see T. Müller et al. in "Biosensors & Bioelectronics", vol. 14, 1999, pp. 247-256). In order to achieve defined field effects, the microelectrodes have to be formed and arranged relative to each other in a particular way. In the case of spatial electrode arrangements this involves very considerable effort in adjusting the channel walls (chip planes). With typical microsystem dimensions in the cm range, the accuracy has to be better than 5 μm. Furthermore, there are problems in the production of the microsystem. Usually, production takes place with techniques used in semiconductor technology, wherein for the spatial electrode arrangement several masks are required for wafer processing. Finally, spatial electrode arrangement involving structured microelectrodes on various channel walls is associated with a problem in relation to electrical contacting. As a rule, electrical contacting needs to be carried out from the top channel wall (top chip plane) to the bottom channel wall, and needs to be led, electrically separated from said bottom channel wall, to a control connection. In particular with a view to mass use of fluidic Microsystems there is an interest in Microsystems of a simplified design and with enhanced functional safety.

It has been known to structure electrically insulating passivation layers in order to obtain a particular field shaping (see DE 198 69 117, DE 198 60 118). Structuring consists of making apertures or breakdowns into the passivation layer above an area-type electrode. Through the apertures, the electrical field can penetrate from the electrode to the channel, and can form the desired field form corresponding to the shape of the aperture. The apertures in the passivation layers are however associated with the disadvantage in that contact is established between the electrode material and the suspension liquid. There is a possibility of irreversible electrode processes occurring. For example, as a result of the field effect, particles can be drawn onto the electrodes and can block the channel. Furthermore, dissolution of the electrode material and thus contamination of the suspension liquid can occur. Up to now, this problem has been countered by the use of suspension liquids with a rather low electrolyte content. However, this has limited the scope of application of the Microsystems. Many biological particles are only able to tolerate a low electrolyte content to a limited degree for an extended period of time.

It is also known that the passivation layers on microelectrodes cause field shielding. This can for example be used in order to strengthen or weaken field gradients in the channel according to a particular spatial gradient (see e.g. T. Schnelle et al., see above, and G. Fuhr et al. in "Sensors and Materials", vol. 7/2, 1995, pp. 131-146). However, there is a disadvantage in that the weakening influence of the passivation layer in suspension fluids with a low electrolyte content (low conductivity) is relatively weak.

It is the object of the invention to provide an improved fluidic microsystem which overcomes the disadvantages of conventional Microsystems. It is in particular the object of the invention to provide a microsystem of a simplified design, in particular simplified electrode arrangement and simplified contacting, enhanced functional safety and an expanded field of application, in particular in the manipulation of biological particles. Furthermore, it is the object of the invention to provide an improved method for the field shaping in fluidic Microsystems, in particular for dielectrophoretic manipulation of particles.

SUMMARY OF THE INVENTION

It is a basic idea of the invention to improve a fluidic microsystem with at least one channel through which a particle suspension can flow, wherein for the purpose of generating electrical alternating-voltage fields in the channel, electrode devices are arranged on the walls of said channel, of which devices a first electrode device for field shaping comprises structuring, while a second electrode device is area-like without any structuring, with a passivation layer, with said improvement being such that the structuring of the first electrode device is smaller by characteristic dimensions than the area-like electrode layer of the second electrode device, and the passivation layer of the second electrode device is a closed layer which completely covers the electrode surface of the second electrode device. As a result of these characteristics, the design of the microsystem is simplified considerably because only the first electrode device, which for example is a bottom electrode device which in the operating position is on the lower chip plane or bottom surface, needs to be structured for the purpose of field shaping, while advantageously an area-like fully passivated electrode layer can simply be provided as the second electrode device, in particular as a top electrode device on the top chip plane or covering surface of the channel, which fully passivated electrode layer only needs a single connecting line for connection to a voltage supply, or, requires no connecting line if the second electrode device is operated so as to be without potential. The area-like second electrode device can be produced without complicated masking steps during wafer processing. Undesirable electrode processes are completely avoided as a result of the closed passivation layer on the second electrode device. The arrangement of the first electrode device on the lower chip plane and of the second electrode device on the top chip plane is not a mandatory characteristic of the invention, but instead it can, in particular, be provided the other way round. Generally speaking, the first and second electrode devices can be provided on various channel walls which form the covering surfaces, bottom surfaces and/or lateral surfaces. Combining a structured electrode device (preferably on the bottom surface) and a non-structured area-like electrode device (preferably on the covering surface) provides a further advantage in that it makes it possible to implement a large variety of electrode arrangements and system functions, as is shown below.

Thus, according to a first embodiment of the invention, the first electrode device can comprise at least one structured electrode layer with individual partial electrodes which in their totality form the structuring or at least a first structured element, as it is known per se from conventional microelectrode arrangements. Providing a number of partial electrodes can be advantageous in relation to separate controllability of each partial electrode. Separate controllability is for example important if the fields in a channel are to be varied depending on certain external influences or measured results. The partial electrodes preferably comprise individually controllable electrode strips, i.e. microelectrodes with an elongated line form of a typical width ranging from 50 nm to 100 μm and a typical length of up to 5 mm. The partial electrodes can comprise passivation layers which, if necessary, have a defined opening which corresponds to the position of the partial electrodes.

According to a second advantageous embodiment, the first electrode device can also be formed by an area-like electrode layer with a closed passivation layer, wherein said passivation layer, in order to form the structuring of the first electrode device, comprises layer structures which comprise a modification of the field transconductance from the electrode layer into the channel when compared to the surrounding regions of the passivation layer. Advantageously, in this way the design of the microsystem can further be simplified because, in each case, opposing electrode devices comprise an area-like electrode layer that is completely passivated. The layer structures in the first passivation layer of the first (e.g. the bottom) electrode device make it possible to provide a serial arrangement of a multitude of functional elements in the channel layout. While these functional elements, in contrast to the situation in the above-mentioned embodiment, cannot be controlled individually, they nevertheless also make possible a design for, and adaptation to, a particular manipulation task.

According to the third and fourth embodiment of the microsystem according to the invention, the second passivation layer of the second (preferably) top electrode device in turn can comprise layer structures for field shaping in the channel. This structuring of the second passivation layer can be combined with a structured electrode layer (several partial electrodes) according to the first embodiment or with an area-like electrode layer comprising a structured passivation according to the second embodiment. Structuring the second passivation layer can have advantages in relation to the field shaping in the channel.

The layer structures on which modulation of the field transconductance into the channel takes place are for example formed by regions of changed (decreased or increased) thickness in the passivation layer. Advantageously, these indented or protruding layer structures can be generated by a simple etching process. The form of the layer structures can be set by masking. Protruding layer structures are in particular preferred when forming the passivation layer with materials of relatively high dielectric constants. As an alternative, the layer structures can include regions which comprise at least one material that differs from that of the surrounding passivation layer, which material is in particular characterized by a changed dielectric constant. Both forms of layer structures, i.e. the thickness variation and the materials variation, can be provided in combination. Furthermore, the passivation layers can be made in several layers from various layer materials.

Further advantages in relation to the design of the microsystem can result if passivation layers are at least partly formed by layer materials whose dielectric characteristics are reversible or irreversibly changeable ("smart isolation"). For example, the layer materials are switched, by laser treatment, between various modifications (e.g. crystalline<–>amorphous) which are characterized by different permittivity values. Such changeable materials are for example known from writable or rewritable optical storage devices (CDs). As an alternative, polymers can be used as changeable layer materials, wherein the conductivity of said polymers can be changed, at least once, by means of laser radiation, as is the case in a direct laser writing method. Advantageously, with this embodiment it is possible to produce specific prototypes particularly economically (e.g. for rapid prototyping).

If in accordance with the above-mentioned second and fourth embodiments of the invention both electrode devices are completely covered, if necessary with structured passivation layers, this can in particular be advantageous if in the microsystem (or externally on the microsystem) in addition an electrode device for generating a direct-voltage field is provided or if by way of external input coupling, e.g. by way of a current scheme, direct-voltage fields are applied to the system. Direct-voltage fields (static fields) are for example formed for electro-osmosis or for electrophoresis in which liquid transport or particle transport takes place under the effect of the direct-voltage field. As an alternative, pulsed direct-voltage fields can be generated which can, for example, be used for electroporation or electrofusion applications. Advantageously, the channel comprises the above-described electrode devices with at least one transverse channel in which a third electrode device for generating electrical direct-voltage fields is arranged in the transverse channel. As a result of the passivation of the first and the second electrode devices, the transport activities in the transverse channel remain undisturbed.

Passivation layers have an advantage when compared to blank electrodes in that the resistance of blank electrodes can change by several orders of magnitude simply by the placement of monolayers. This can happen relatively easily during chip manufacture or during operation; it endangers the function of dielectric elements, in particular in those cases where the layers are not homogeneous. In order to avoid this problem, up to now additional measures (plasma etching etc.) had to be taken. In contrast to this, additional layers on passivation layers have a significantly less interfering effect. The functional safety of microsystems is improved by this.

The invention also relates to a method for dielectrophoretic manipulation of suspended particles in fluidic Microsystems by field shaping using lateral structures in passivation layers on electrodes.

BRIEF DESCRIPTION OF SEVERAL VIEWS OF THE DRAWINGS

Further advantages and details of the invention are contained in the following description of the enclosed drawings. The following are shown:

FIGS. 1A-1E: diagrammatic views of various embodiments of Microsystems according to the invention (sections);

FIG. 2: a further diagrammatic illustration of an electrode device with a structured passivation layer;

FIGS. 4A, B: an embodiment of the invention comprising a gradient structure in the passivation layer;

FIG. 5: a further embodiment of an electrode arrangement formed according to the invention;

DETAILED DESCRIPTION OF PREFERRED EMBODIMENTS

Figure 3:
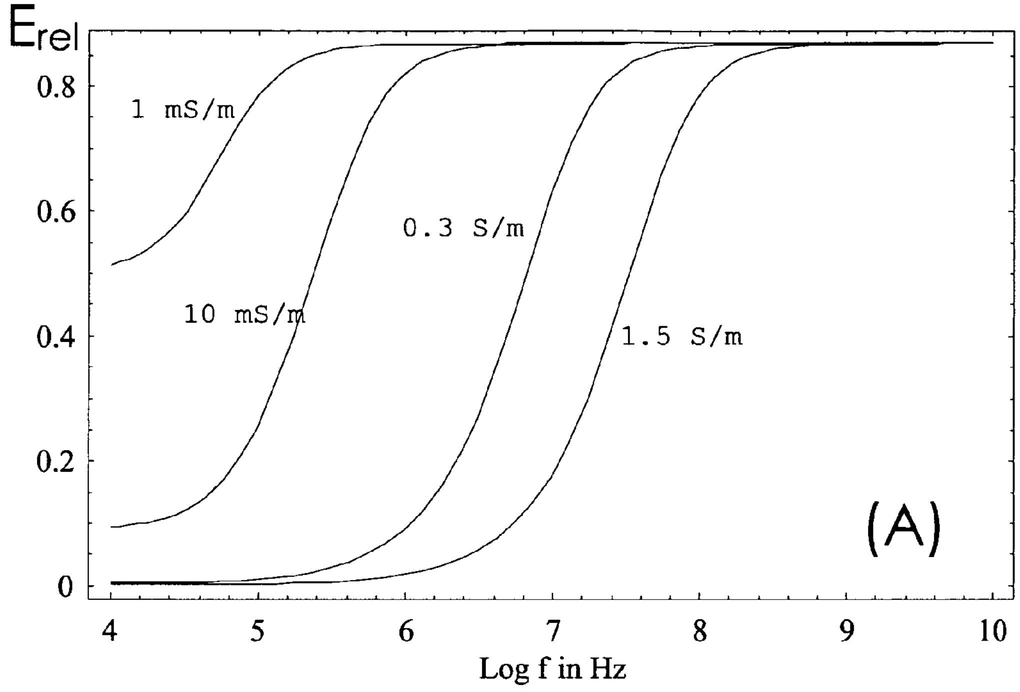
FIGS. 3A-3D graphs for illustrating the field effect of the passivation layers provided according to the invention.
Figure 3:
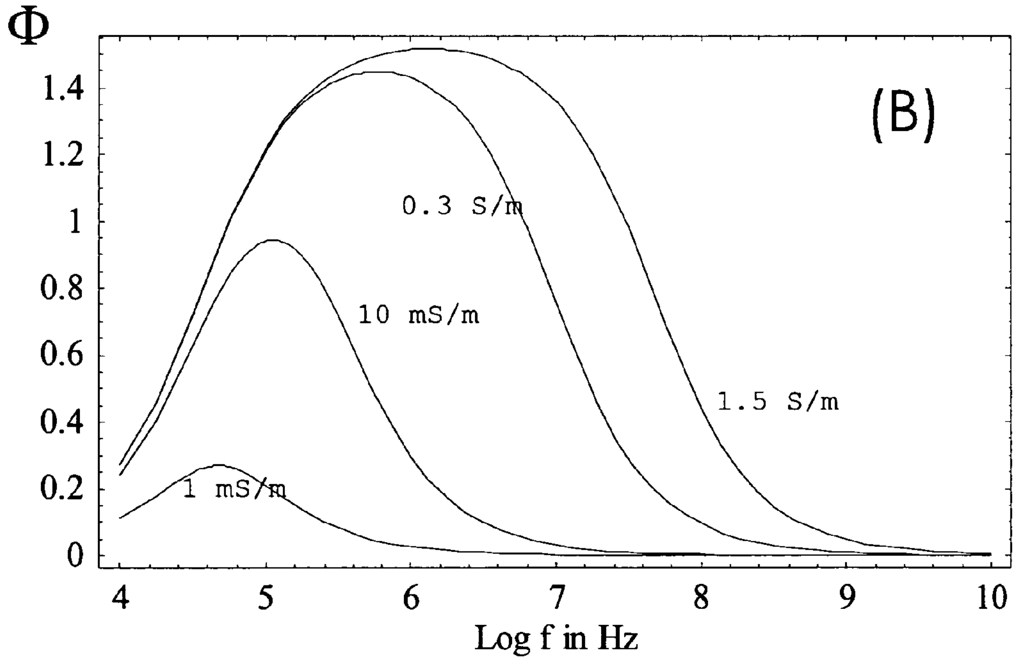
Figure 3:
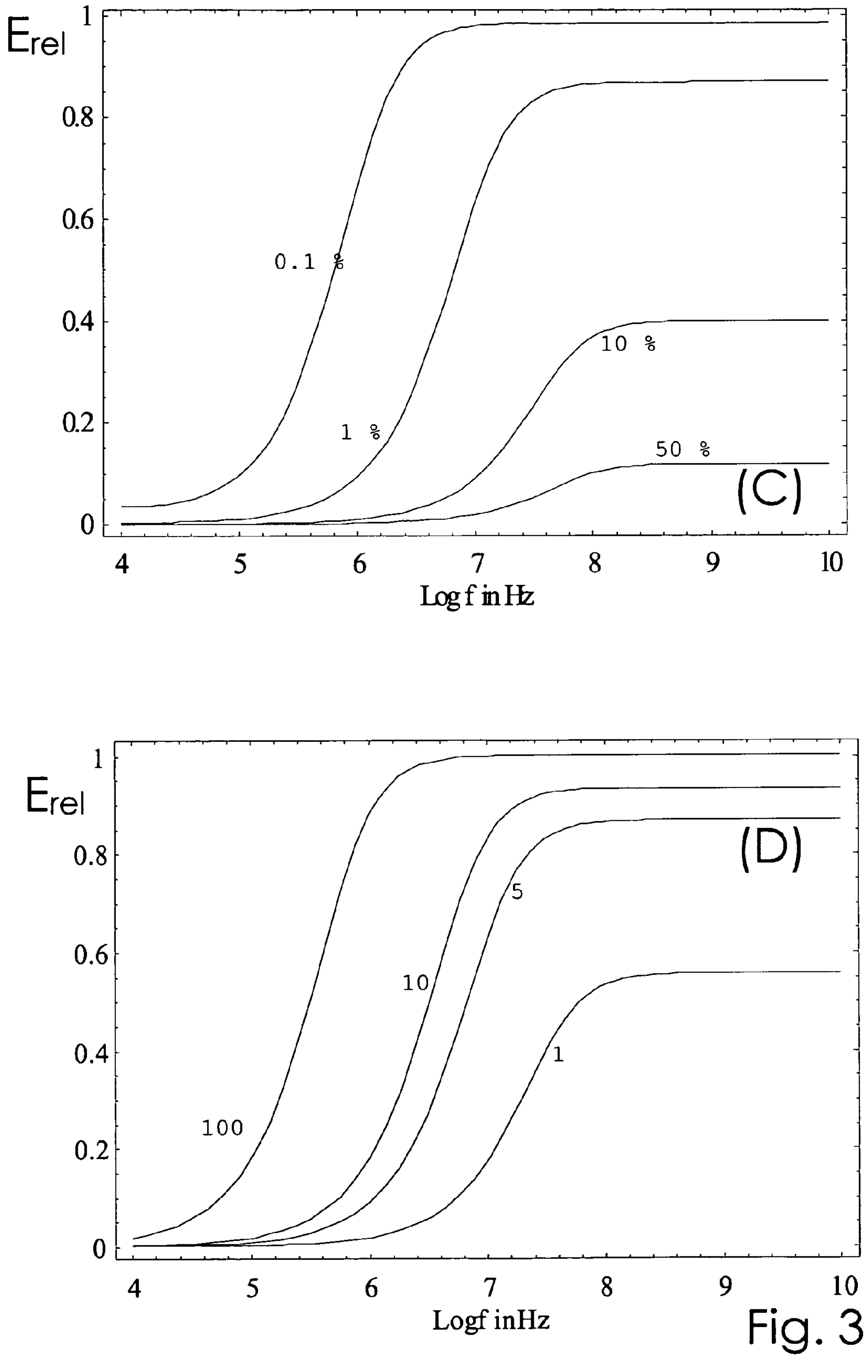

FIG. 1A is a diagrammatic perspective view of part of a fluidic microsystem 100 according to the invention. The microsystem 100 comprises at least one channel 10 which is formed between two plate-shaped chip elements, namely the bottom element or substrate 20 and the covering element 30. For the sake of clarity, further parts of the microsystem, in particular lateral walls, spacers and the like, are not shown. The substrate 20 forms a first (bottom) channel wall with a bottom surface 21 pointing to the channel 10, wherein a first electrode device, if necessary comprising a first passivation layer (see below), is arranged on said bottom surface 21. The covering element 30 forms the second (top) channel wall with a covering surface 31, facing the channel 10, on which covering surface 31 the second electrode device (see below) is arranged correspondingly. For the purpose of generating a field in the channel 10, at least one of the electrode devices is connected to an alternating-voltage source (not shown). According to the invention the passivation layer is provided on at least one of the electrode devices.

The channel 10 is formed by a space between the chip elements 20, 30. Liquid, in particular a particle suspension, can flow through said channel, whose height ranges for example from 5 μm to 1 mm and whose transverse and longitudinal dimensions, which are selected depending on the application, are in the μm to cm range. The chip elements 20, 30 are typically made of glass, silicon or an electrically non-conductive polymer.

The right, enlarged, section of FIG. 1A shows the layer design made of electrode devices and a passivation layer. For example, on the bottom surface 21 of the substrate 20 there is the first electrode device 40 and a first passivation layer 50 (see e.g. FIG. 1C). The layer design is formed by planar technology, which is known per se, by deposition of the desired materials onto the substrate. The electrode device comprises an electrically conductive material, e.g. a metal or a conductive oxide, e.g. Sn doped $In_2O_3$, (ITO) indium-cadmium-oxide ($In_xCd_{1-x}O$) $Cd_2SnO_4$, or a conductive polymer (e.g. polyaniline, polypyrrole, polythiophene). The thickness of the electrode device ranges for example from 50 nm to 2 μm. The passivation layer 50 is a dielectric insulation layer with a thickness ranging from 0.1 μm to 10 μm. It comprises for example polyimide or an electrically insulating oxide, e.g. silicon oxide or silicon nitride.

FIGS. 1B to 1E illustrate the above-mentioned four preferred embodiments of the invention with diagrammatic top views of the first (bottom) and second (top) channel walls 21, 31.

According to FIG. 1B, the first electrode device 40 for field shaping in the channel is of a structured design. Generally it comprises at least one first structural element, which in the example shown comprises four electrode elements or partial electrodes 41 which are made in a way which is known per se in a strip shape on the bottom surface 21. The partial electrodes 41 can be covered by a passivation layer (not shown) which, if necessary, in a way which is known per se comprises breakthroughs on the surfaces of the partial electrodes 41.

The second electrode device 60 on the covering surface 31 comprises an area-like electrode layer 61 (shown by a dashed line) with a closed second electrode surface which is completely covered by a second passivation layer 70.

The invention provides for the first structured elements 41 of the first electrode device 40 to form a smaller effective electrode surface than the second electrode surface 61 of the second electrode device 60 (the sum of the individual surfaces of the first electrode device 40 is smaller than the second electrode surface 61). Consequently, when electrical voltages are applied to the electrode devices 40, 60, field line paths arise which on the bottom surface 21 at the partial electrodes 41 with greater field line density unite and end at the covering surface 31 in the electrode layer 61. The electrical field in the channel is formed according to the shape of the partial electrodes. For example, a field barrier or a field cage is formed with which the movement of particles in the channel can be influenced, or with which particles can be held.

According to a first operating mode, the electrode layer 61 of the second electrode device 60 can be connected to a control device by way of a connecting line. In a way that differs from that of conventional electrode arrangements, advantageously only one connecting line is sufficient to form the counter electrode, for example for a field cage of a barrier shape according to the partial electrodes 41. According to a second operating mode, the second electrode device can be arranged on the covering surface 31 without any connection to a control device. In this so-called "floating" state, the potential of the second electrode device automatically forms depending on the surrounding potential situation. In each case a charge distribution is formed in the electrode layer, which charge distribution in the interior of the electrode layer balances the field which occurs in the channel. In this case, advantageously, contacting can be completely done without.

FIG. 1C illustrates an example of the above-mentioned second embodiment of the invention, in which both electrode devices 40, 60 are formed by area-like closed electrode layers 42, 61, which in each case are covered by closed passivation layers 50, 60. The first (bottom) electrode device 40 comprises at least one structured element, which in this embodiment comprises a structure in the first passivation layer 50. The layer structure in the first passivation layer 50 comprises regions 51 of e.g. reduced thickness and/or materials that vary when compared to the remaining passivation layer. The regions 51, laterally in the layer plane, are of a geometric shape corresponding to the conventionally formed microelectrodes, i.e. for example a strip shape. According to FIG. 1C, the second electrode device 60 is formed by an electrode layer with a closed non-structured passivation layer 70, as is shown in FIG. 1B.

By using the structured passivation layer 50 on the area-like electrode layer 42, the geometric shape of the transfer of the electrical field from the electrode layer 42 to the channel is set in a predetermined way corresponding to the shape of the regions 51. The regions 51 can, for example, form a lining-up element with a funnel-shaped field barrier (FIG. 1C). As an alternative, several structured regions (field structure elements) can be implemented in a passivation layer which covers a closed electrode layer. This has the advantage that a fluidic microsystem, e.g. a sorting system comprising several functional elements, is designed with only two electrodes, located on opposite channel walls and comprising structured passivation, wherein if applicable only one electrode is controlled with a high-frequency voltage while the other electrode is left in the floating state.

According to FIG. 1D the principle can be modified such that the first electrode device on the bottom surface 21 comprises several partial electrodes 41 as shown in FIG. 1B, while the second electrode device 60 is covered by a structured passivation layer 70. The structured regions 71 in the passivation layer 70 are for example of a geometric shape which corresponds to the alignment of the opposite partial electrodes 41 for creating the field cage.

Finally, according to the above-mentioned fourth embodiment (FIG. 1E), structuring can be provided on both passivation layers, i.e. both on the bottom surface and on the covering surface.

FIG. 2 is an enlarged exploded perspective view of a section of an electrode device according to the invention, with a structured passivation layer. On the substrate 20 there is the electrode layer 40 comprising a dielectric insulation layer or the passivation layer 50 comprising a structured region 51 processed thereon. The thickness $d_P$ of the passivation layer 50 is for example 600 nm. On the structured region 51 the thickness $d_S$ is reduced to a value of e.g. 200 nm or is formed with a changed composition which has different electrical characteristics, a changed dielectric constant or a changed specific electrical conductivity.

Structuring the passivation layer 50 can for example take place by means of photolithography. If the first and/or second passivation layer is at least partly formed by a layer material whose dielectric characteristics are reversible or irreversibly changeable, structuring can for example take place by laser radiation corresponding to the geometry of the desired structures.

FIGS. 3A to 3D illustrate the effect of the passivation layers structured according to the invention, using the results of model calculations. The design of the two electrode devices on the channel walls with the channel through which suspension flows is modeled using a liquid filled plate capacitor assuming capacitor plates of infinite size, in which capacitor, for example, one electrode comprises a passivation layer. The field strength in the interior of the channel (or of the plate capacitor) depends both on the frequency and on the dielectric and geometric circumstances. Modeling takes place with the following parameters: dielectric constant of the suspension or solution between the capacitor plates: 80; dielectric constant of the passivation layer: 5; and conductivity of the passivation layer: $10^{-5}$ S/m.

FIG. 3A illustrates the relative field strength $E_{rel}$ (field strength with passivation layer/field strength without passivation layer) in the channel, depending on the frequency f at various conductivities of the aqueous suspension in the channel. The thickness of the passivation layer is 1% of the spacing of the electrode device. FIG. 3A shows that field input coupling into the channel depends on the conductivity of the suspension and on the frequency. Surprisingly, it has been shown that the insulating effect of the passivation layer depends on the frequency, with the insulation effect rising as the electrolyte content rises.

With the same parameters as those in FIG. 3A, FIG. 3B shows the phase position $\phi$ (in rad) of the electrical field. The phase position $\phi$ also strongly depends on the frequency as the conductivity increases. In line with the results shown in FIGS. 3A and 3B, electrical field gradients in the channel can be implemented with homogeneous electrodes in relation to the phase and the amplitude. This can, for example, be applied to achieve an eight-pole cage, which conventionally required eight electrodes, with the use of only four electrodes, wherein each electrode by means of suitable passivation furnishes two signals, each phase-shifted by approximately 90°.

FIG. 3C shows the relative field strength $E_{rel}$ in the channel depending on the frequency at various thicknesses of the passivation layer, in each case shown as a percentage relative to the electrode spacing. Modeling took place with a water-filled channel (conductivity 0.3 S/m). It has been shown that the field transconductance is considerably reduced as the thickness of the passivation layer increases, and that this effect is frequency-dependent. Corresponding to the result illustrated in FIG. 3C, locally, on the structured regions (e.g. 51 in FIGS. 1C, E) by way of a reduction in thickness an increase of the field strength in the channel can be achieved. This effect depends on the frequency. This means that a functional element in the fluidic microsystem can be activated or ineffective, depending on the frequency.

A corresponding result has been shown in structuring the passivation layer by placing regions with different dielectric constants. At a suspension conductivity of 0.3 S/m and a thickness of the passivation layer of 1% of the electrode spacing, as shown in FIG. 3D, as the dielectric constant increases the field transconductance also increases, even at lower frequencies.

The results according to FIG. 3 show a particular advantage of the invention to the effect that as a result of structured passivation, modulation of the field in the channel is particularly effective at lower conductivities of the suspension in the channel. When manipulating artificial particles, in particular made of plastic, e.g. latex beads, there is an interest in using low conductivities. For example at a salt content of 1 mM, a conductivity of approximately 14 mS/m results. Biological cells are often handled in media of a conductivity around 1 S/m. Short-term (up to 10 min) dielectric manipulation in low conductivity of up to 1 mS/m is well tolerated. Typically 0.05-0.3 S/m is used for dielectric manipulation.

According to a particular advantage of the invention, the structured passivation layers form frequency filters. Due to a high field transconductance, certain field fractions at certain frequencies are let through at the structured regions (e.g. 51), while other frequency fractions are attenuated (see FIG. 3). This effect depends on the thickness and/or composition of the structured regions of the passivation layer. If the electrode devices are driven by high-frequency voltage signals, for example of a rectangular signal shape, which signal shape correspondingly represents a superposition of a multitude of frequencies, by way of the passivation layer it is possible to modulate the frequency composition in the channel. Since the dielectrophoretic effect of the electrical fields is in particular frequency-dependent, the function of the respective electrode device can be set by way of the frequency of the control current.

According to an alternative embodiment of the invention, structuring of the passivation layer in itself can be of an inhomogeneous design. For example, a region 51 of reduced thickness in the passivation layer 50, as shown in FIG. 4A, can in itself comprise a thickness gradient. At one end 51_a_ of greater thickness, the field transconductance is less than at the opposite end 51_b_ of lesser thickness. On this basis by way of a strip-shaped passivation layer according to FIG. 4B alone, a filter for various particle types or particle sizes can be formed. A particle mixture flowing into a partial channel in the direction of the arrow encounters the field barrier which is formed on the structured region 51. The small particles, which are influenced to a relatively small extent by a strong field, can move past the field barrier at region 51 without being deflected, while the larger particles are first deflected to a region of reduced field transconductance. Correspondingly, after passing the region 51, the particles of various sizes follow different paths in the channel.

FIG. 5 shows further details of a dielectric filter element according to the invention, in which filter element the first electrode device 40 is provided at the top chip plane. The bottom element 20 and the covering element 30, are formed by glass substrates which are installed one above the other so as to be spaced apart, thus forming the upper and lower delimitation of the channel 10. The spacing h is for example in the range from 5 μm to 100 μm. On the upper covering surface 31, an electrode strip 41 with a passivation layer 50 is provided. The electrode strip 41 is connected to a voltage supply (not shown) by way of a connecting line 43. The passivation layer 50 is open above the electrode strip 41.

On the bottom part 20 there is a unstructured electrode layer 61 as the second electrode device, and on it there is a structured passivation layer 70. In the region 71 the thickness of the passivation layer 70 is reduced, and/or the composition of said passivation layer 70 is varied. At a thickness of the passivation layer in the region 71 of 10% of the electrode spacing (e.g. 400 nm to 600 nm), in the channel, above the structured region 71, the relative field strength increases from 0.1 to 0.7 (see FIG. 3C) at a frequency of 1 MHz. As a result of this, in the electrodes, locally, an adequately high field gradient can be generated in the flow that moves through the channel 10. The field gradient forms a field barrier which, for example, retains large particles while letting small particles pass through. Advantageously, use is made of the circumstance that there is square law scaling between the effective retention force and the field strength.

Figure 6:
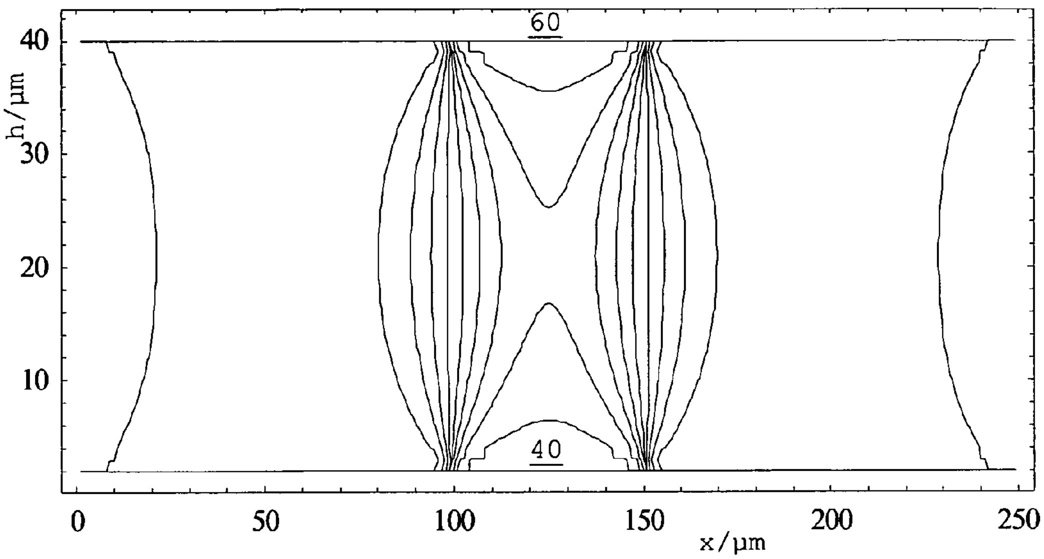
FIG. 6: a field barrier formed according to the invention.

The simulated projection in FIG. 6 shows the distribution of the field strength squares, i.e. of the potentials for dielectric force effect, in an exemplary embodiment comprising two strip-shaped electrode structures 40, 60 (spacing h=40 μm), each comprising a passivation layer (not shown) 5 μm in thickness. Each passivation layer comprises two strips 50 μm in width, each strip containing a substance with an increased dielectric constant (permittivity=100, e.g. TiO; higher values of permittivity of up to 12,000 are possible in the case of titanates such as BaTio, SrTiO, CaTiO, PbTiO), while the remaining passivation layer in each case comprises polyimide (permittivity=3.5) or $SiN_xO_y$. The channel 10 is filled with water at 10 mS/m. Sinusoidal signals at a frequency of 10 MHz are applied to the electrodes. Between the opposite electrode devices 40, 60, concentric field line paths form which form two field barriers for the particles flowing in the channel 10.

Figure 7:
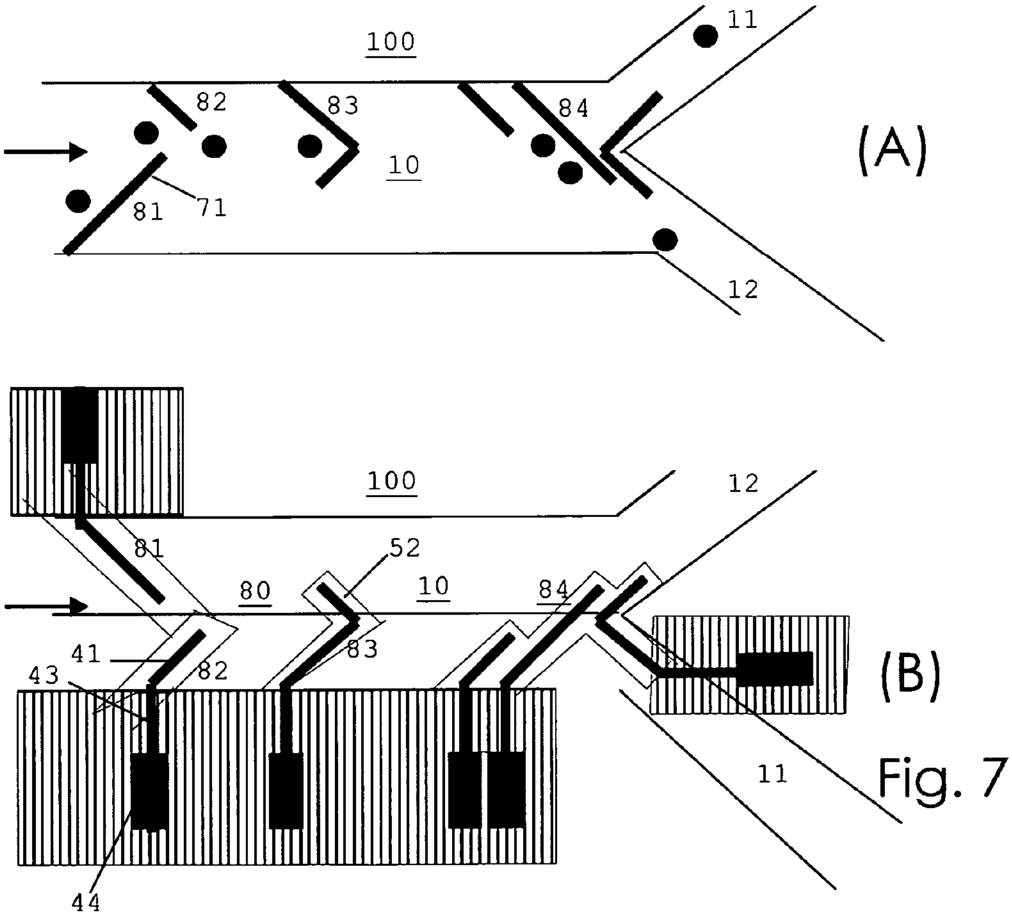
FIGS. 7A, 7B: diagrammatic illustrations of a further embodiment of a fluidic microsystem according to the invention.

FIGS. 7A and 7B are diagrammatic top views, as seen from channel 10, of the top (A) and bottom (B) channel wall of a fluidic system 100 according to the invention with the channel 10, which branches into two partial channels 11, 12. In channel 10, by way of dielectric functional elements 80, two deflectors 81, 82, a hook 83, and a switch (shunt) 84 are arranged, as is known from fluidic microsystem technology. Furthermore, measuring devices, e.g. particle detectors, can be provided.

The bottom chip plane (FIG. 7B) is built analogously to FIG. 1D in a way which is known per se, with individually controllable partial electrodes. The partial electrodes, e.g. 41, of various geometric shapes each comprise a connecting line 43 which leads to connecting positions (bondpads) 44. The electrode regions which are not required for dielectric manipulation of the particles are completely passivated. Passivation is open above the active electrode regions (see e.g. 52).

The top chip plane (FIG. 7A) is of a simpler structure. Analogously to FIG. 1D, a single electrode layer (not shown) with a closed electrode surface is provided, on which a passivation layer (not shown) with structured regions 71 is formed. In order to generate an electrical field between the electrode pairs of the upper and lower chip planes, the electrode layer of the top plane and the partial electrodes of the bottom plane are simply connected to a voltage supply (generator).

The field-forming structures (partial electrodes and structures in the passivation layer) can be arranged so as to be offset in the direction of the channel in order to form a field advancing in the direction of the channel.

The particles are fed into the channel 10 in the direction of the arrow and subjected to the field barrier at the partial electrodes. Depending on the desired function, individual partial electrodes can be switched on or off. For trouble free separation of the individual functional elements, preferably a lateral electrode spacing (in the direction of the channel) is set which exceeds the height of the channel.

Figure 8:
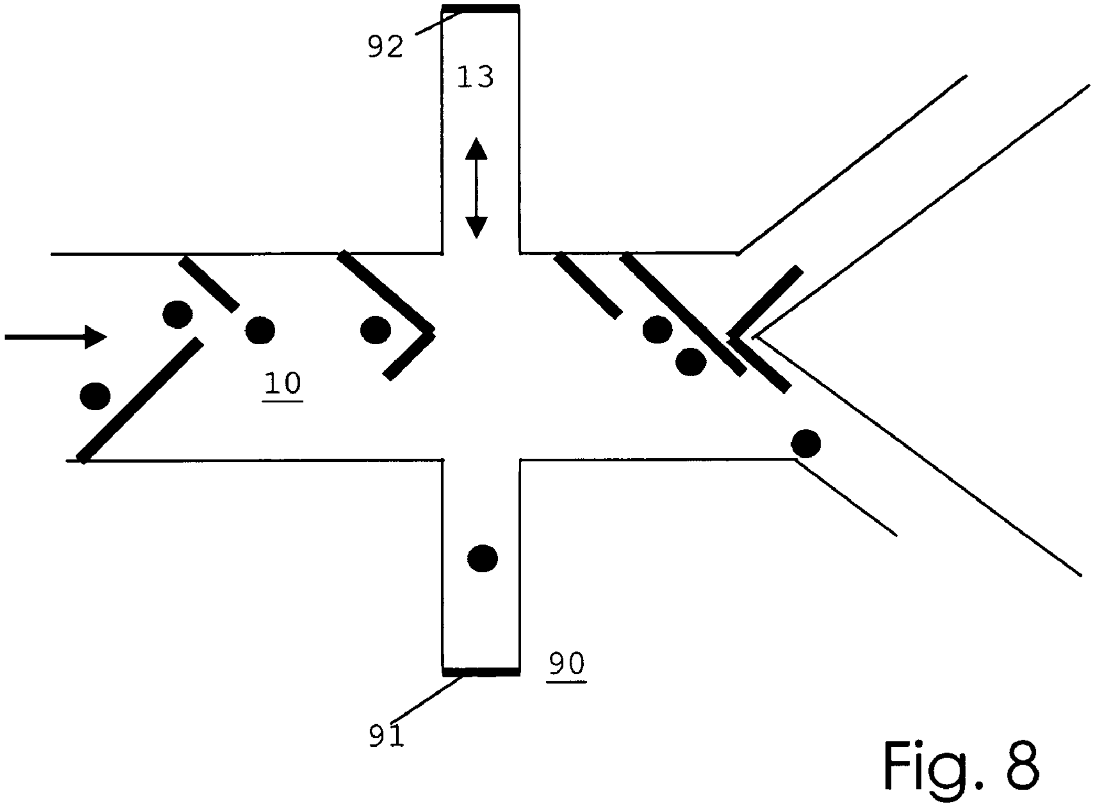
FIG. 8: a further embodiment of a fluidic microsystem according to the invention.

FIG. 8 shows an example of a microsystem 100 according to the invention, in which both the bottom and the top electrode devices are completely covered, if necessary with structured passivation layers, and in addition a transverse channel 13, which branches off perpendicularly or at an inclined angle, with a third electrode device 90 for generating a direct-voltage field is provided. In the transverse channel 13, between the electrodes 91, 92, liquid transport or particle transport can take place as a result of electro-osmosis or electrophoresis under the effect of the direct-voltage field (see double arrow), wherein said transport remains undisturbed by passivation of the first and second electrode devices. For example it is provided, depending on the signal of a particle detector, for a particle to be deflected into the transverse channel 13. Furthermore, when a particle passes at the transverse channel 13, electroporation processes or electrofusion processes can be triggered if pulsed direct voltages are applied.

The characteristics of the invention disclosed in the above description, drawings and in the claims can be significant both individually and in combination for implementing the invention in its various embodiments.

The invention claimed is:

1. A fluidic microsystem comprising:

at least one channel through which a particle suspension can flow; and first and second electrode devices which are arranged on first and second channel walls for generating electrical alternating-voltage fields in the channel; wherein the first electrode device is adapted for field shaping in the at least one channel and comprises at least one first structure element; and the second electrode device comprises an area-like second electrode layer with a closed second electrode surface comprising a second passivation layer, wherein an effective electrode surface of the at least one first structure element is smaller than the closed second electrode surface; and the second passivation layer is a closed layer completely covering the second electrode layer, and the second passivation layer comprises at least one second structure element for field shaping in the at least one channel, said at least one second structure element being formed by second layer structures in the second passivation layer.

2. The micro system according to claim 1, wherein the at least one first structure element comprises at least one structured partial electrode.

3. The micro system according to claim 2, wherein the first electrode device, by way of partial electrodes, comprises individually controllable electrode strips.

4. The micro system according to claim 1, wherein at least one of the first layer structures and the second layer structures comprise regions of changed thickness in the first passivation layer and the second passivation layer.

5. The microsystem according to claim 4, wherein the regions are inhomogeneous with at least one of a thickness gradient and a material gradient.

6. The microsystem according to claim 1, wherein at least one of the first layer structures and the second layer structures comprise regions containing at least one material differing from a material of a remaining and surrounding portion of the first passivation layer or the second passivation layer.

7. The microsystem according to claim 6, wherein the regions are inhomogeneous with at least one of a thickness gradient and a material gradient.

8. The microsystem according to claim 1, wherein at least one of the first passivation layer and the second passivation layer is at least partly formed by a layer material whose dielectric characteristics are reversibly or irreversibly changeable.

9. The microsystem according to claim 1, wherein a third electrode device is provided for generating electrical direct-voltage fields or direct-voltage pulses in the at least one channel or in a transverse channel branching off from the at least one channel.

10. The microsystem according to claim 1, wherein an external electrode device is provided for generating electrical direct-voltage fields or direct-voltage pulses in the at least one channel or in a transverse channel branching off from the at least one channel.

11. A method for field shaping in a channel of a fluidic microsystem according to claim 1, wherein a geometric shape of electrical fields in the channel is determined by a geometric shape of layer structures in passivation layers in which there is a modified field transconductance.

12. A fluidic microsystem comprising:

at least one channel through which a particle suspension can flow; and first and second electrode devices which are arranged on first and second channel walls for generating electrical alternating-voltage fields in the channel; wherein the first electrode device is adapted for field shaping in the at least one channel and comprises at least one first structure element; and the second electrode device comprises an area-like second electrode layer with a closed second electrode surface comprising a second passivation layer, wherein an effective electrode surface of the at least one first structure element is smaller than the closed second electrode surface;

the second passivation layer is a closed layer completely covering the second electrode layer; and the first electrode device comprises an area-like electrode layer with a closed first electrode surface which comprises a closed first passivation layer, wherein the closed first passivation layer comprises first layer structures which form the at least one first structure element.

13. The micro system according to claim 12, wherein at least one of the first passivation layer and the second passivation layer comprise(s) several layers.

* * * * *